J. V. DUPIN & J. M. ANIZAN.
SAP COLLECTING DEVICE.
APPLICATION FILED OCT. 11, 1906.

908,222.

Patented Dec. 29, 1908.

Witnesses:
W. H. Berrigan
F. H. Logan

Inventors
JEAN VALMY DUPIN and JOSEPH MICHAEL ANIZAN,
By their Attorneys
van Oldenneel & Schoenlank

UNITED STATES PATENT OFFICE.

JEAN VALMY DUPIN AND JOSEPH MICHEL ANIZAN, OF LABOUHEYRE, LANDES, FRANCE.

SAP-COLLECTING DEVICE.

No. 908,222.　　　Specification of Letters Patent.　　　Patented Dec. 29, 1908.

Application filed October 11, 1906. Serial No. 338,345.

*To all whom it may concern:*

Be it known that we, JEAN VALMY DUPIN and JOSEPH MICHEL ANIZAN, citizens of the Republic of France, and residents of Labouheyre, Landes, France, have invented certain new and useful Improvements in Sap-Collecting Devices, of which the following is a description.

The invention relates to a simplified arrangement of parts whereby the gutter or spout, utilized for the purpose of directing the resiniferous material towards a pail or collecting vessel, is caused to directly sustain a stirrup or frame for holding a pail or pot. In a modified form, said gutter or spout is utilized, in the form of an apron, to also sustain a cover above such pot or pail, and preferably in such manner as to have only a small portion or edge in contact with the pot or pail.

Prior to our invention, it was the practice, so far as we are aware, to secure the stirrup to a tree separately from the plate or guide for directing the resiniferous matter to a pail or pot.

Figure 1:
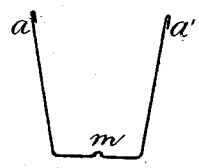
Figure 2:
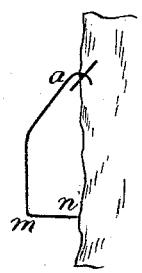
Figure 3:
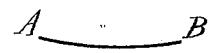
Figure 4:
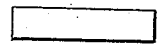
Figure 6:
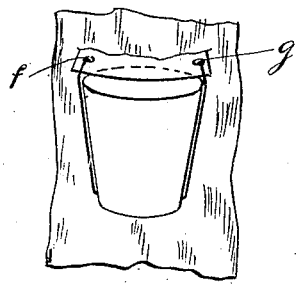
Figure 7:
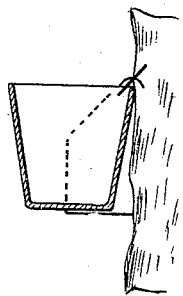
Figure 5:
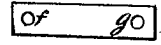
Figure 8:
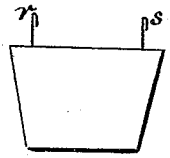
Figure 10:
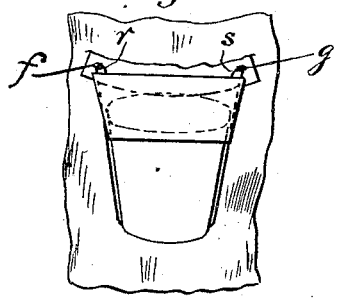
Figure 11:
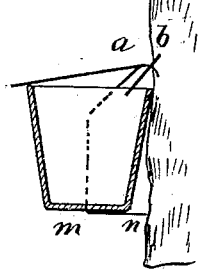
Figure 9:
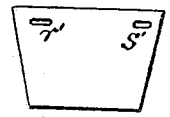

Referring to the accompanying drawings, Figure 1 is a front view of a stirrup which may be used with our improvements; Fig. 2 is a side view showing the manner of securing said stirrup to a gutter or apron, and of securing said gutter or apron to a tree, Fig. 3 is an edge view of an apron or spout; Fig. 4 is a top view thereof; Fig. 5 is a like view, showing the openings to be engaged by the hooks of a stirrup; Fig. 6 is a front view showing the relative positions of a gutter or apron, a stirrup and a collecting pot or pail; Fig. 7 is a sectional view; Fig. 8 is a top view of one form of lid or cover, and Fig. 9 is a like view of another form; Figs. 10 and 11 are views, similar to Figs. 6 and 7, the lid being added.

Referring to Fig. 1, the stirrup, for holding a collecting pail or pot in position, may be a single piece of wire, bent to form a frame having its upper ends $a$ formed with hooks $a^1$, the said bars being formed to extend outwardly and downwardly, and the bottom member or bar, connecting the sides, being bent at $m$, upwardly and rearwardly.

The form of apron or spout preferably employed is a long and narrow rectangular strip of material (metal), bent or curved (see Fig. 3) so as to cause the resiniferous collect or sap to flow to the central line of the apron or spout, and be readily shed from a single part thereof. Preferably, the clamp is formed to be readily engaged by the stirrup and, for this purpose, the apron or spout may have holes $f$ and $g$ near its opposite ends.

In use, the apron or spout, bent to the form A—B, Fig. 3, is forced or fitted into the tree, and the stirrup is suspended from said apron (as shown in Fig. 2) by having the hooks $a'$ of the stirrup engage into the openings $f$ and $g$ of the apron. A pot or pail is then fitted (as shown in Figs. 6 and 7) into the frame or stirrup, so as to have the lower edge of the apron or spout overhang the pot or pail and readily direct resiniferous material thereinto. The apron or gutter may also be used to sustain a cover or lid above a pail or pot, so as to exclude foreign matter from the latter. To assure this result, the lid or cover (preferably of trapezoid shape) may be provided with hooks $r$, $s$ (Fig. 8) or with openings or slots ($r^1$, $s^1$, Fig. 9). In the former case the hooks may engage the openings (as $f$ and $g$ of Fig. 5) of the guide, or apron, or when the lid has slots therein, the slots may engage hooks or other parts upon said apron. The advantage of thus articulately sustaining the cover from the apron is that the lid is inclined, readily shedding material therefrom, and only a small portion of such cover contacts with the edge of the pot or cover, thus minimizing the adhesion produced between the lid and the rim of the pot or pail.

In the drawings, we show a comparatively narrow guide or apron. When fastened to a tree, this assures a very short apron, and a long travel of the resinous matter (resulting in loss of essences) is avoided.

The preferred arrangement, whereby the stirrup is suspended from the apron, permits the whole apparatus to be shifted when desired.

What we claim is:

In a device of the class described, an apron adapted to fit an incision of a tree and provided with openings, and a stirrup or frame, for holding a pot or pail, having hooks at its upper ends engaging said openings.

In testimony whereof we affix our signatures in presence of two witnesses.

JEAN VALMY DUPIN.
　　　　JOSEPH MICHEL ANIZAN.

Witnesses:
　LOUIS J. GRICOT,
　ALBERT PHILLIPS.